United States Patent [19]

Lacroix

[11] 4,420,113

[45] Dec. 13, 1983

[54] METHOD OF AND SYSTEM FOR CONTROLLING THE OPERATION OF A HEATER

[75] Inventor: Alain Lacroix, Lyons, France

[73] Assignee: Societe Lyonnaise des Applications Catalytiques, Rillieux-la-Pape, France

[21] Appl. No.: 383,125

[22] Filed: May 28, 1982

[30] Foreign Application Priority Data

May 29, 1981 [FR] France .................................. 81 11018

[51] Int. Cl.$^3$ .......................... G05D 23/00; H05B 1/02
[52] U.S. Cl. ................................ 236/1 EB; 236/46 F; 219/497; 307/265
[58] Field of Search ................ 236/78 D, 46 F, 74 A, 236/1 EB; 318/596; 307/265; 219/499, 497; 165/26; 62/158

[56] References Cited

U.S. PATENT DOCUMENTS 3,149,293 9/1964 Farkas ................................ 236/46 F
3,419,775 12/1968 Kardos ................................ 318/596

Primary Examiner—William E. Wayner
Attorney, Agent, or Firm—Karl F. Ross

[57] ABSTRACT

A space heater, designed to maintain the temperature of a room between a lower limit $T_m$ and an upper limit $T_M$, is controlled by a system including a sawtooth-wave generator working by way of a clipping stage into a differential amplifier also receiving a monitoring signal representing the difference between an output voltage of a temperature sensor and a reference voltage. The differential amplifier emits a train of command pulses of temperature-dependent duration which temporarily reduce the mean power of the heater to a fraction of its maximum value, as by periodically interrupting its fuel supply when that heater comprises a gas burner. The heater is cut off for an extended period when the upper range limit $T_M$ is exceeded and is then restarted when the temperature falls beneath the lower limit $T_m$. In the case of a gas burner of the catalytic type, the cut-in is accompanied by a supply of additional gas to the burner for a limited time.

11 Claims, 8 Drawing Figures

METHOD OF AND SYSTEM FOR CONTROLLING THE OPERATION OF A HEATER

FIELD OF THE INVENTION

My present invention relates to a method of and a system for controlling the operation of a heater, more particularly (but not exclusively) of a catalytic gas burner forming part of such a heater.

BACKGROUND OF THE INVENTION

In the case of electrical space heaters it is well known to control their energization so as to vary their power inversely with the temperature measured at some location within their environment. This mode of regulation, serving to maintain the temperature of the heated space at a substantially constant level, is generally more satisfactory than the usual thermostatic control according to which a heater is turned off when the temperature exceeds the upper limit of a selected range and is turned on again when it drops beneath the lower range limit. Such an on/off control, moreover, is particularly uneconomical in the case of a catalytic gas burner which is known to operate with reduced efficiency upon start-up after cooling and which, accordingly, ought to be supplied during such a start-up phase with fuel at an increased rate. This conventional mode of operation therefore practically prevents the utilization of such burners in industrial plants, hothouses or the like.

In my copending application Ser. No. 372,053, filed Apr. 26, 1982, I have disclosed a system for the control of a catalytic gas burner wherein a flow regulator enables the gas supply to be adjusted manually or automatically in response to changing temperatures. Since, however, proper combustion always requires a certain minimum supply rate, this regulator can reduce the heating effect only to a limited extent. If, for example, the space heated by such a burner experiences an increase in temperature due to incident sunlight, the regulator will not be able to reduce the power of the heater sufficiently to compensate for that temperature rise.

OBJECTS OF THE INVENTION

The general object of my present invention, therefore, is to provide a method of and a system for so operating a heater as to keep the temperature of a room (or, possibly, of certain equipment) normally within a desired range and taking into account the effect of extraneous heat sources such as the sun.

A more particular object is to provide a method of and a system for controlling the operation of a catalytic gas burner.

SUMMARY OF THE INVENTION

According to an important aspect of my present invention, a heater is operated at full power as long as the temperature sensed at a location in its environment lies beneath a lower limit of a predetermined regulating range. Upon a rise of that temperature above this lower limit, the mean power of the heater is varied generally inversely with temperature changes within the aforementioned range; if the temperature exceeds the upper range limit, the heater is cut off and its operation is restarted only when the temperature drops again beneath the lower range limit.

According to a more particular feature of my invention, the variation of the mean heater power in the presence of temperatures within the selected range includes a series of brief interruptions of its operation for variable periods, as by cutting off the gas supply to a burner thereof. When the burner is of catalytic type, the restarting of the operation is accompanied by the supply of gas at an above-normal rate for a limited time in order to improve the operating efficiency of the heater at that stage. Such an augmentation of the gas supply, however, will not be necessary after the short-time interruptions during steady-state operation with temperature maintenance within the selected range, provided that the burner is equipped with a pilot flame or some other device for instantly reigniting it when the gas flow is unblocked.

If the sun or some other external source supplies additional heat driving the measured temperature above the upper range limit, this steady-state mode will be discontinued for as long as the temperature remains above the lower range limit. In a hothouse, for example, the heater operation may terminate early on a sunny day and not recommence until evening even though clouds may temporarily obscure the sun and drop the temperature below the upper range limit. The need for a new start-up, accompanied by an increased gas supply in the case of a catalytic burner, will therefore arise only infrequently under any but the most adverse circumstances.

Pursuant to another aspect of my invention, a system for operating a heater comprises thermosensing means measuring the temperature to be stabilized, conversion means (e.g. an amplifier) coupled to the thermosensing means for continuously emitting monitoring signals representative of the measured temperature, circuit means establishing first and second thresholds respectively corresponding to a lower and an upper range limit, and control means connected to the conversion means and to the circuit means for operating the heater with maximum power in response to a monitoring signal indicative of a temperature less than the lower range limit, cutting off the heater in response to a monitoring signal indicative of a temperature exceeding the upper range limit, and operating the heater intermittently with progressively decreasing mean power in response to monitoring signals indicative of rising temperatures within the regulating range. The control means includes a generator of command pulses of variable width operative in the presence of a monitoring signal which lies between the two thresholds.

The command-pulse generator advantageously comprises a differential amplifier having inputs respectively connected to a sawtooth oscillator, forming part of the aforementioned circuit means, and to the conversion means for emitting an inhibiting command during overlap of the monitoring signal with a sawtooth signal from the oscillator. I also prefer to insert a clipping circuit between the oscillator and the differential amplifier for truncating the sawtooth signal at a level corresponding to one of the two thresholds, especially the lower one in order to prevent premature power reductions when heater operation is started or restarted.

Since the sawtooth signal is not needed when the temperature is either below or above the regulating range, the control means may be designed to block the sawtooth oscillator during start-up as well as during times of power cutoff. For this purpose the threshold-establishing circuit means may include comparison means for setting a flip-flop, forming part of the control means, when the monitoring signal reaches the first threshold and resetting the flip-flop when the signal reaches the second threshold. The same flip-flop may be used to emit an enhancement command over a predetermined time interval on being set, thereby operating a valve supplying a catalytic burner with gas at an above-normal rate during start-up.

BRIEF DESCRIPTION OF THE DRAWING

The above and other features of my invention will now be described in detail with reference to the accompanying drawing in which.

SPECIFIC DESCRIPTION

Figure 1:
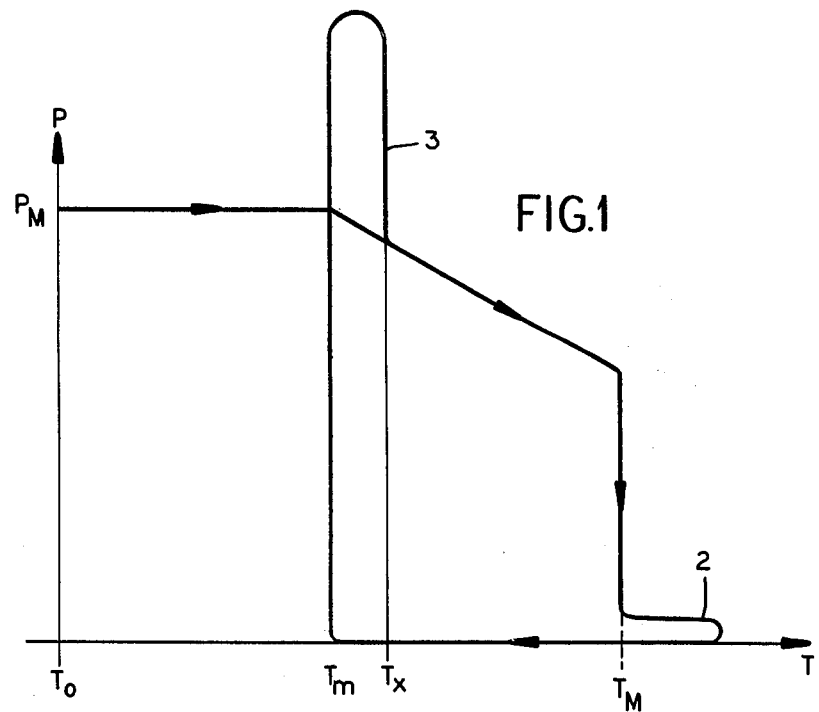
FIG. 1 is a graph depicting the mode of operation of a heater in response to temperature pursuant to my present invention.

In FIG. 1 the power P supplied to a heater (in terms of fuel or electric current) has been plotted against temperature T measured at the location of interest. On start-up, with $T=T_0$, the heater is energized with its maximum power $P_M$ until the temperature has reached a lower limit $T_m$ of a range in which regulation is to take place. Within that range the power P supplied to the heater diminishes, generally as a linear function of temperature T, in order to establish a more or less constant level between the lower limit $T_m$ and an upper range limit $T_M$.

If, for whatever reason, the monitored temperature drops below the range limit $T_m$, full power $P_M$ is restored until that limit is again surpassed. If, however, overheating should occur on account of incident sunlight, for example, power is completely cut off as soon as the limit $T_M$ is reached. As indicated at 2 in FIG. 1, such overheating may well go beyond the temperature level $T_M$. When that happens, the heater is deactivated to let the temperature drop beneath both limits $T_M$ and $T_m$; only when the latter limit is reached, thus with a significant thermal hysteresis, will the heater be reactivated. If the heater comprises a catalytic gas burner, such reactivation ought to be accompanied by a power surge above the normal maximum $P_M$ as indicated at 3 in FIG. 1; this power surge, designed to improve the efficiency of the catalytic burner after cooling, may be terminated after a predetermined length of time or, as indicated in FIG. 1, when the temperature has risen to a level $T_x$ within the range of regulation.

Figure 2:
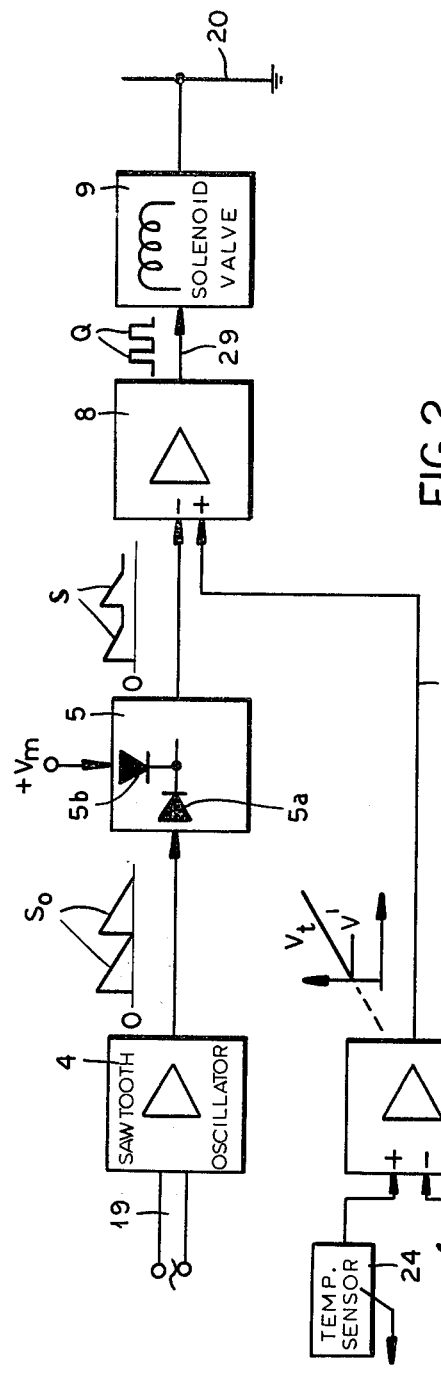
FIG. 2 is a block diagram of a system for controlling the operation of a heater according to my invention.

FIG. 2 shows a control system according to my invention including a sawtooth oscillator 4 connected by a line 19 across a supply of electric current. Oscillator 4 generates a sawtooth voltage $S_0$ which is fed to a clipping circuit 5 comprising two diodes 5a and 5b. Diode 5b is connected to a source of positive voltage $V_m$ which, as will become apparent hereinafter, establishes the lower range limit $T_m$ of FIG. 1 and cuts off the descending flank of sawtooth voltage $S_0$, traversing the diode 5a, to produce a truncated sawtooth wave S in the output of clipper 5. Voltage S is fed to an inverting input of a comparator 8, designed as an operational amplifier, whose noninverting input receives a monitoring voltage $V_t$ on an output lead 30 of a similar comparator 6 acting as a signal converter. Comparator 6 has a noninverting input connected to the output of a temperature sensor 24, disposed at a suitable location in the environment of the heater to be controlled, and receives at its inverting input a steady reference voltage V' which is adjustable with the aid of a potentiometer 7'. Another potentiometer 7" applies to the operational amplifier 6 an adjustable biasing voltage V" controlling its gain. Thus, the temperature-monitoring voltage $V_t$ on lead 30 represents the suitably amplified difference between the output voltage of sensor 24 and the selected reference voltage V'.

Figure 8:
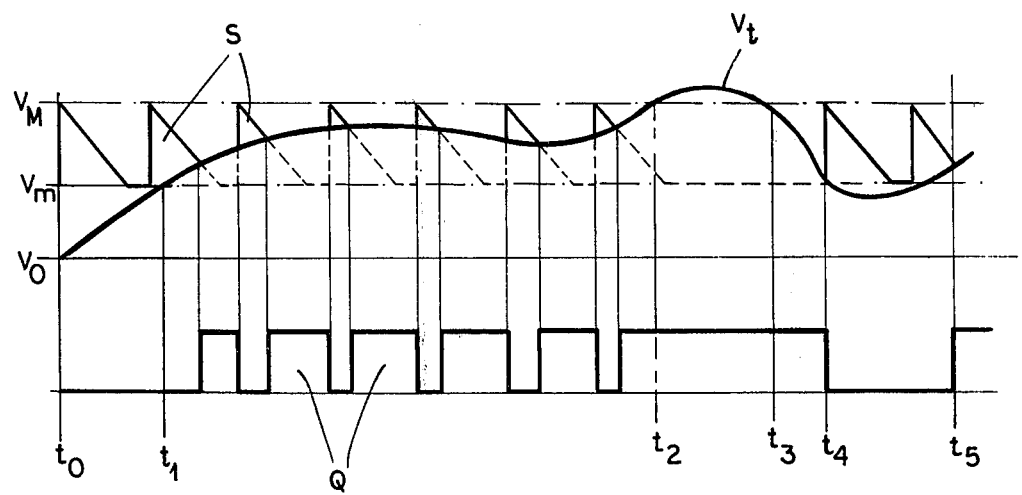
FIG. 8 is a set of graphs serving to explain the operation of a voltage comparator included in the system of FIGS. 2 and 4.

As long as the monitoring voltage $V_t$ has a magnitude indicating that the temperature measured by the sensor 24 lies within the range bounded by levels $T_m$ and $T_M$, comparator 8 emits a train of command pulses Q whose width increases with rising voltage $V_t$. Thus, as illustrated in FIG. 8, voltage $V_t$ starts at a time $t_0$ with a value $V_0$ which lies beneath the threshold $V_m$ representing the lower range limit $T_m$. The output of comparator 8 is zero until voltage $V_t$ surpasses the threshold $V_m$ at an instant $t_1$ whereupon a pulse Q appears in its output as soon as the descending flank of the next sawtooth S lowers the potential of its inverting input to less than that of its noninverting input. This pulse Q persists to the end of the current sawtooth cycle and, with monitoring voltage $V_t$ still rising, is followed in the next cycle by a somewhat wider pulse Q. The pulses Q, acting as inhibiting commands, are delivered on an output lead 29 of comparator 8 to a solenoid valve 9 which controls the gas supply of the associated heater and which cuts off that supply for the duration of such a pulse; the solenoid circuit is shown completed through a ground lead 20. With the mean power of the heater correspondingly reduced, the temperature measured by sensor 24 will level off and stabilize between range limits $T_m$ and $T_M$—represented by threshold voltages $V_m$ and $V_M$—as long as no extraneous heat source intervenes. At an instant $t_2$ indicated in FIG. 8, however, such intervention is shown to drive the voltage $V_t$ above the threshold $V_M$ substantially coinciding with the level of the peaks of sawteeth S. When this occurs, the output of comparator 8 remains high so that the gas supply is interrupted for an indefinite period.

Figure 3:
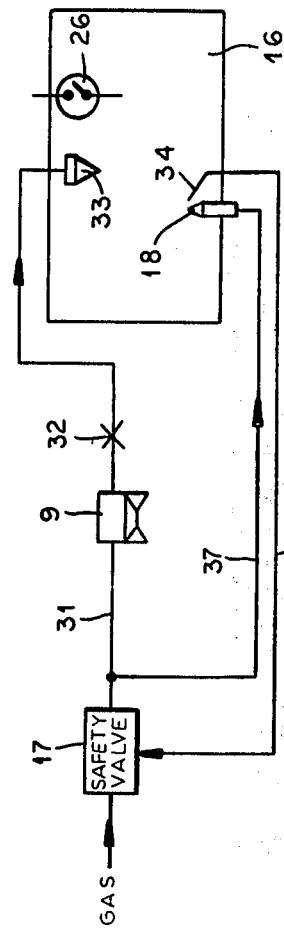
FIG. 3 is a diagrammatic representation of a conduit system for fueling a gas heater controlled by the thermoelectric system of FIG. 2.

The controlled heater, diagrammatically illustrated at 16 in FIG. 3, has a catalytic burner represented by a nozzle head 33 to which gas is supplied via a safety valve 17, a conduit 31, the solenoid valve 9 of FIG. 2 and a throttle 32. A branch 37 of conduit 31 feeds a pilot nozzle 18 juxtaposed with a thermoelectric sensor 34 controlling, via a lead 27, the valve 17 to block the conduit 31 in the even that the gas flow is interrupted by a malfunction. The safety valve 17 may be of the type described in my above-identified copending application Ser. No. 372,053. The pilot flame emitted by nozzle 18 enables instant reignition of the main nozzle assembly 33 as soon as solenoid valve 9 is reopened upon the disappearance of an inhibiting command Q; a switch 26 serves for manual reactivation of the heater and may comprise a pushbutton as likewise described in that copending application.

Figure 4:
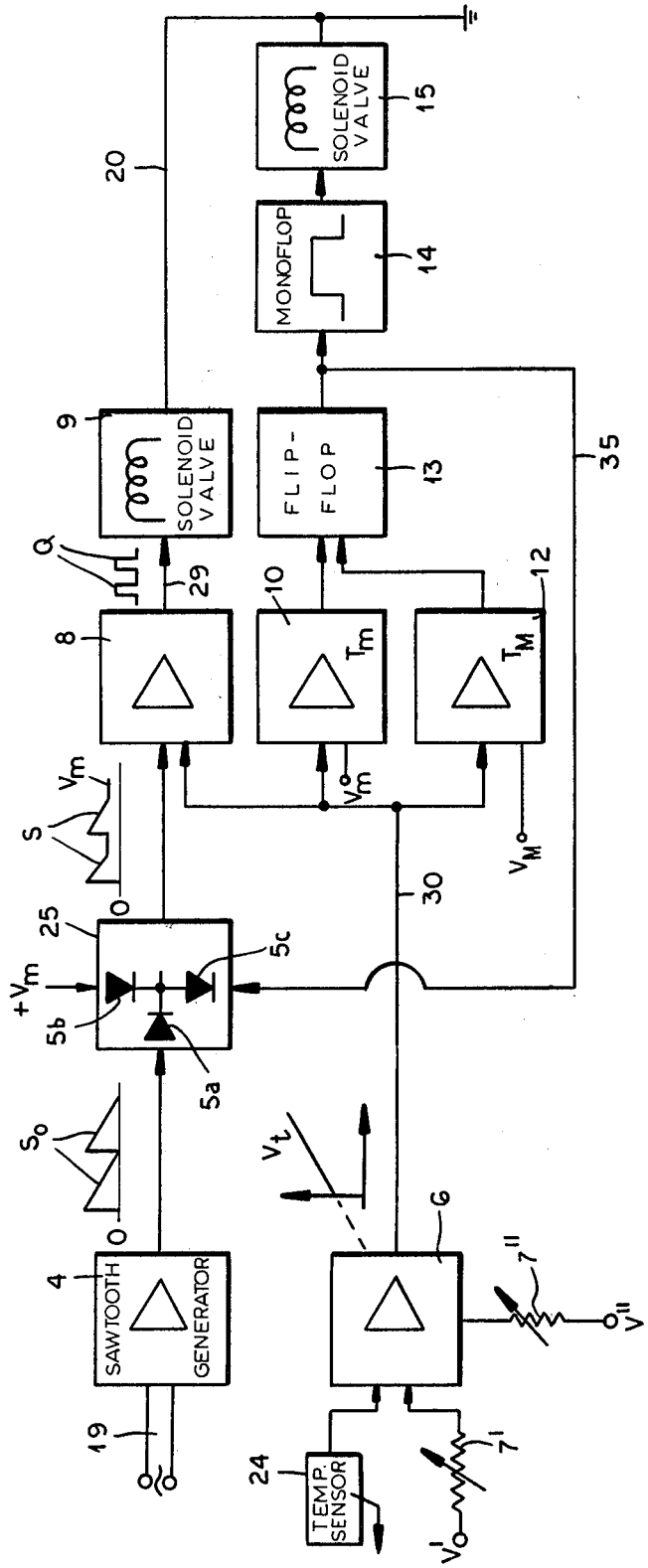
FIG. 4 is a block diagram similar to that of FIG. 2 but showing a more elaborate system.

In FIG. 2 I have not shown any means for delaying the reoperation of the heater until the temperature has dropped beneath the lower range limit $T_m$ or for increasing the gas supply above its normal maximum rate as indicated at 3 in FIG. 1. Such means have been illustrated in FIG. 4 showing a more elaborate control system in which the monitoring voltage $V_t$ is also supplied to two threshold comparators 10 and 12 each having an input connected to lead 30 in parallel with the noninverting input of operational amplifier 8. Comparator 10, whose other input receives the threshold voltage $V_m$ (or possibly a negative voltage of the same absolute magnitude), works into a setting input of a flip-flop 13 whose resetting input is tied to the output of comparator 12 receiving on its second input a threshold voltage of magnitude $V_M$. A modified clipping circuit 25 includes a third diode 5c, whose anode is tied to the junction of the cathodes of diodes 5a and 5b, connected by way of a lead 35 to the set output of flip-flop 13. The same output is tied to an input of a monoflop 14 controlling another solenoid valve 15 which is opened by an enhancement command generated during the off-normal period of the monoflop after the latter is tripped by a setting of flip-flop 13. Such setting occurs when the system is first placed in operation (at time $t_0$ in FIG. 8), as by a closure of the switch 26 shown in FIG. 3; monoflop 14, therefore, opens the valve 15 during the initial start-up as well as upon a restarting of the heater after an automatic deactivation due to a surpassing of the upper range limit $T_M$, an event accompanied by a resetting of the flip-flop as the threshold comparator 12 notes a momentary coincidence between voltages $V_t$ and $V_M$. With flip-flop 13 thus reset at instant $t_2$, diode 5c virtually grounds the inverting input of comparator 8 so that its output remains high and holds the solenoid valve 9 closed even after monitoring voltage $V_t$ drops below the upper range limit $V_M$ as indicated at instant $t_3$ in FIG. 8. Only when that monitoring voltage reaches the lower limit $V_m$, at an instant $t_4$, will the setting of flip-flop 13 by threshold comparator 10 let the comparator 8 resume its normal operation with termination of the high output voltage holding the solenoid valve 9 in its flowblocking position. The generation of inhibiting pulses Q recommences at an instant $t_5$ after voltage $V_t$ has again risen above threshold $V_m$.

Figure 5:
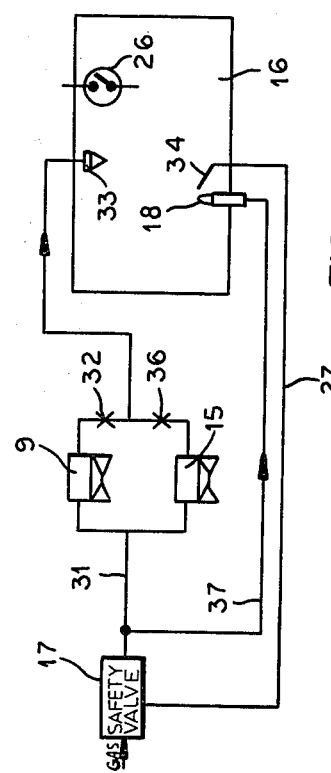
FIG. 5 diagrammatically represents a conduit system similar to that of FIG. 3 but relating to the control system of FIG. 4.

In FIG. 5 the valve 15 has been shown connected to conduit 31 in parallel with valve 9, the two valves 9 and 15 feeding the nozzle assembly 33 through respective throttles 32 and 36.

Figure 6:
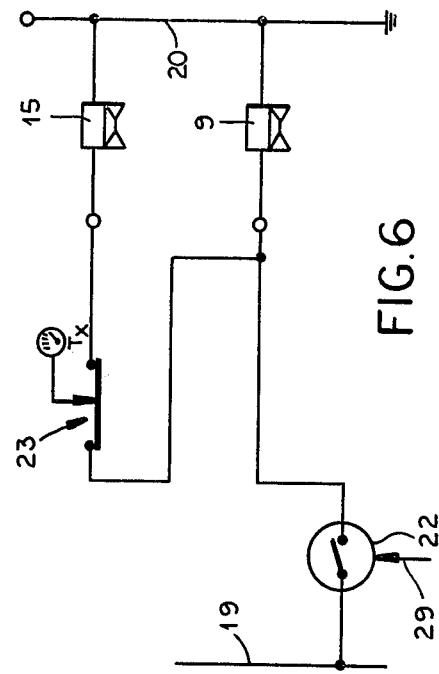
FIGS. 6 and 7 show switching circuits usable with the control system of FIG. 2 or 4.

In FIG. 6 I have shown a switch 22 connecting the two solenoid valves 9 and 15 in parallel with each other across the power supply 19, 20 for the unblocking of their respective conduit branches. Switch 22 is controlled by the voltage on output lead 29 of comparator 8 (FIGS. 2 and 4) so as to open whenever that voltage is high, as in the presence of an inhibiting command Q. Another switch 23 lies in series with the ancillary solenoid valve 15 and is controlled by a sensor 28 disposed adjacent the catalytic panel of heater 16 (FIG. 5); switch 23 remains closed during an initial warm-up period, when the heater is to be supplied with additional gas for improved efficiency as discussed above, and is opened to shut off the flow of extra gas once a suitable temperature—such as that indicated at $T_x$ in FIG. 8—has been reached. Since the enhancement command is here generated by a simultaneous closure of switches 22 and 23, the monoflop 14 is omitted even if the associated control system is otherwise identical with that of FIG. 4.

Figure 7:
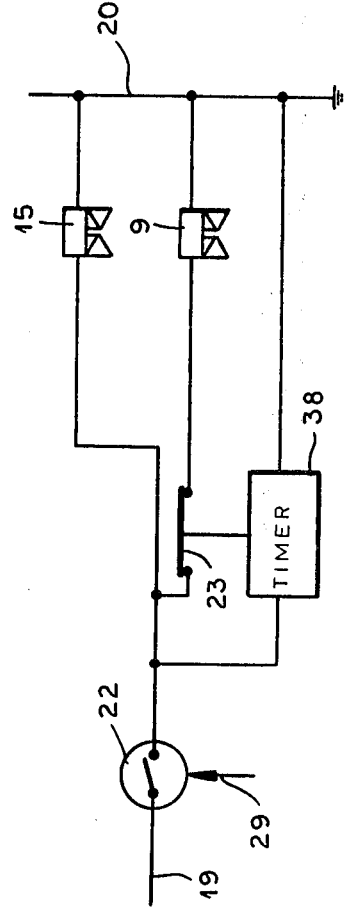

FIG. 7 shows a similar arrangement wherein a timer 38, connected in parallel with valves 9 and 15, opens the switch 23 a predetermined period after these valves are first energized to unblock the gas flow, as by the closure of a master switch such as the one shown at 26 in FIGS. 3 and 5. Timer 38 includes an integrator which prevents it from responding to short-term interruptions of the power supply by the inhibiting pulses Q; thus, the timer will reclose the switch 23 only after a prolonged opening of switch 22 (such as the interval $t_2$-$t_4$ shown in FIG. 8) and will then again measure the delay during which valve 15 is held open.

If the heater 16 of FIG. 5 is provided with a special igniter, as described in my copending application Ser. No. 372,053, that igniter may have a gas inlet connected to the conduit branch extending between valve 15 and throttle 36 in FIG. 5.

I claim:
1. A method of operating a heater, comprising the steps of:
    (a) continuously sensing the temperature of a location in the environment of the heater;
    (b) operating the heater at full power as long as said temperature lies beneath a lower limit of a predetermined range;
    (c) upon a rise of said temperature above said lower limit, varying the mean power of said heater generally inversely with temperature changes within said range;
    (d) cutting off the heater upon said temperature exceeding a predetermined upper limit of said range; and
    (e) restarting the operation of said heater only upon said temperature dropping again beneath said lower limit.

2. A method as defined in claim 1 wherein step (c) includes a series of brief interruptions of heater operation for variable periods.

3. A method as defined in claim 2 wherein said heater comprises a gas burner whose gas supply is cut off during said variable periods in step (c).

4. A method as defined in claim 3 wherein said burner is of catalytic type, comprising the further step of
    (f) supplying gas at an above-normal rate to said burner for a limited time commencing with step (e).

5. A system for operating a heater, comprising:
    thermosensing means at a location within the environment of the heater to be operated;
    conversion means coupled to said thermosensing means for continuously emitting monitoring signals representative of the temperature at said location;
    circuit means establishing a first threshold and a second threshold respectively corresponding to a lower limit and an upper limit of a predetermined temperature range, said circuit means including comparison means connected to said conversion means for indicating a passing of said first and said second threshold by said monitoring signals; and
    control means connected to said conversion means and to said circuit means for operating said heater with maximum power in response to a monitoring signal having a magnitude relative to said first threshold indicative of a temperature less than said lower limit, cutting off said heater in response to a monitoring signal having a magnitude relative to said second threshold indicative of a temperature exceeding said upper limit, and operating said heater intermittently with progressively decreasing mean power in response to monitoring signals of magnitudes between said thresholds indicative of rising temperatures within said range, said control means including a generator of command pulses of variable width operative in the presence of a monitoring signal lying between said first and second thresholds, said control means further including switch means responsive to said comparison means for preventing a reoperation of said heater, following a cutoff thereof in response to a monitoring signal passing said second threshold, until a monitoring signal passing said first threshold is detected.

6. A system as defined in claim 5 wherein said circuit means comprises a sawtooth oscillator and said generator comprises a differential amplifier with inputs respectively connected to said oscillator and to said conversion means, said differential amplifier emitting an inhibiting command during overlap of said monitoring signal with a sawtooth signal of said oscillator.

7. A system as defined in claim 6 wherein said circuit means further comprises a clipping circuit inserted between said oscillator and said differential amplifier for truncating said sawtooth signal at a level corresponding to one of said thresholds.

8. A system as defined in claim 5, 6 or 7 wherein said heater comprises a catalytic gas burner having a gas inlet provided with valve means responsive to said control means for blocking the gas supply in the presence of an inhibiting command, said valve means being responsive to an enhancement command from said control means upon reoperation of said heater after cutoff for supplying said burner with gas at a rate temporarily increased above a normal maximum.

9. A system as defined in claim 8 wherein said switch means comprises a flip-flop settable by said comparison means upon said monitoring signal reaching said first threshold and resettable by said comparison means upon said monitoring signal reaching said second threshold, said flip-flop blocking said generator upon being reset by said comparison means.

10. A system as defined in claim 9 wherein said control means further includes timing means connected to said flip-flop for emitting said enhancement command over a predetermined period upon a setting of said flip-flop by said comparison means.

11. A system as defined in claim 5, 6 or 7 wherein said conversion means comprises a comparator generating said monitoring signal as the difference between an output voltage of said thermosensing means and an adjustable reference voltage.

* * * * *